United States Patent
Radhakrishnan et al.

(10) Patent No.: US 8,498,978 B2
(45) Date of Patent: Jul. 30, 2013

(54) SLIDESHOW VIDEO FILE DETECTION

(75) Inventors: Venkatesh Babu Radhakrishnan, Bangalore (IN); Srinivasan H. Sengamedu, Banglaore (IN)

(73) Assignee: Yahoo! Inc., Sunnyvale, CA (US)

( * ) Notice: Subject to any disclaimer, the term of this patent is extended or adjusted under 35 U.S.C. 154(b) by 851 days.

(21) Appl. No.: 12/345,674

(22) Filed: Dec. 30, 2008

(65) Prior Publication Data
US 2010/0169292 A1 Jul. 1, 2010

(51) Int. Cl.
*G06F 7/00* (2006.01)
*G06F 17/30* (2006.01)

(52) U.S. Cl.
USPC ......................................................... 707/710

(58) Field of Classification Search
USPC ......................................................... 707/710
See application file for complete search history.

(56) References Cited

U.S. PATENT DOCUMENTS

| | | | |
|---|---|---|---|
| 6,278,446 B1 * | 8/2001 | Liou et al. | 715/700 |
| 7,246,314 B2 * | 7/2007 | Foote et al. | 715/700 |
| 2005/0160107 A1 * | 7/2005 | Liang | 707/100 |
| 2009/0079871 A1 * | 3/2009 | Hua et al. | 348/584 |

* cited by examiner

*Primary Examiner* — Fred I Ehichioya
*Assistant Examiner* — Kris Mackes
(74) *Attorney, Agent, or Firm* — Evergreen Valley Law Group, P.C.; Kanika Radhakrishnan

(57) ABSTRACT

Slideshow video file detection. A method includes receiving a search query for video files of a desired type. A portion of a video file is extracted. A frame difference based histogram and an active pixel based histogram are generated for the portion. Further, the frame difference based histogram and an active pixel based histogram are provided to a machine learning tool. An indicator is determined for the portion based on a plurality of parameters. The video file is classified as the desired type based on the indicator. The video file is provided to the user.

13 Claims, 7 Drawing Sheets

SLIDESHOW VIDEO FILE DETECTION

BACKGROUND

With the advent of technology, a number of applications, for example Yahoo! Video facilitate users to upload and play video files. Such video files may be slideshow video files or non slideshow video files. A slideshow video file is a presentation of a series of photographic slides. A non-slideshow video file is a real video file captured with a video file recorder. A user having an account with a particular website can upload as many video files as the user desires. The video files are tagged with keywords which in turn help in searching the video files. The user can key in a keyword and search for desired video files. However, the video files resulting from the search can include both slideshow video files and non-slideshow video files. In current scenario the user needs to manually identify non-slideshow video files or slideshow video files and search. This process is tedious and time consuming. Further, the identification of video files as slideshow video files and non-slideshow video files becomes unmanageable when thousands of video files are involved.

In light of the foregoing discussion, there is a need for an efficient technique for detecting relevant video files.

SUMMARY

Embodiments of the present disclosure described herein provide a method, system and article of manufacture for detecting slideshow video files.

An example of an article of manufacture includes a machine-readable medium, and instructions carried by the medium and operable to cause a programmable processor to perform receiving a search query for video files of a desired type. A portion of a video file is then extracted. A frame difference based histogram and an active pixel based histogram are generated for the portion. Further, the frame difference based histogram and the active pixel based histogram is provided to a machine learning tool. An indicator is determined for the portion based on a plurality of parameters. The plurality of parameters includes sign vectors, feature vectors, weight vectors, and threshold vectors associated with the portion. The video file is tagged to be of a desired type based on the indicator. The result is provided to the user based on their search criteria.

An example of an article of manufacture includes a machine-readable medium, and instructions carried by the medium and operable to cause a programmable processor to perform receiving a video file. A portion of the video file is then extracted. A frame difference based histogram and an active pixel based histogram are generated for the portion. Further, the frame difference and the active pixel based histogram are provided to a machine learning tool. An indicator is determined for the portion based on a plurality of parameters. The plurality of parameters includes sign vectors, feature vectors, weight vectors, and threshold vectors associated with the portion. The video file is tagged as one of a slideshow or a non-slideshow video file based on the indicator. The video file is stored along with a tag.

An example of a method includes electronically receiving, in a computer system, a search query for video files of a desired type. A portion of a video file is extracted for each file satisfying the search query. Further, a frame difference based histogram and an active pixel based histogram is generated electronically in the computer system. The frame difference based histogram and the active pixel based histogram is provided to a machine learning tool. An indicator is determined for the portion based on a plurality of parameters. The plurality of parameters includes sign vectors, feature vectors, weight vectors, and threshold vectors associated with the portion. The video file is classified as the desired type based on the indicator. The video file is provided to the user based on the search query.

An example of a system includes one or more remotely located electronic devices. The system also includes a communication interface in electronic communication with the one or more remotely located electronic devices for receiving a search query. Further, the system includes a memory for storing instructions. The system also includes a processor responsive to the instructions to determine video files satisfying the search query and to categorize the video files as slideshow or non-slideshow. Moreover, the system includes a storage device for storing the video files.

DETAILED DESCRIPTION OF THE EMBODIMENTS

Figure 1:
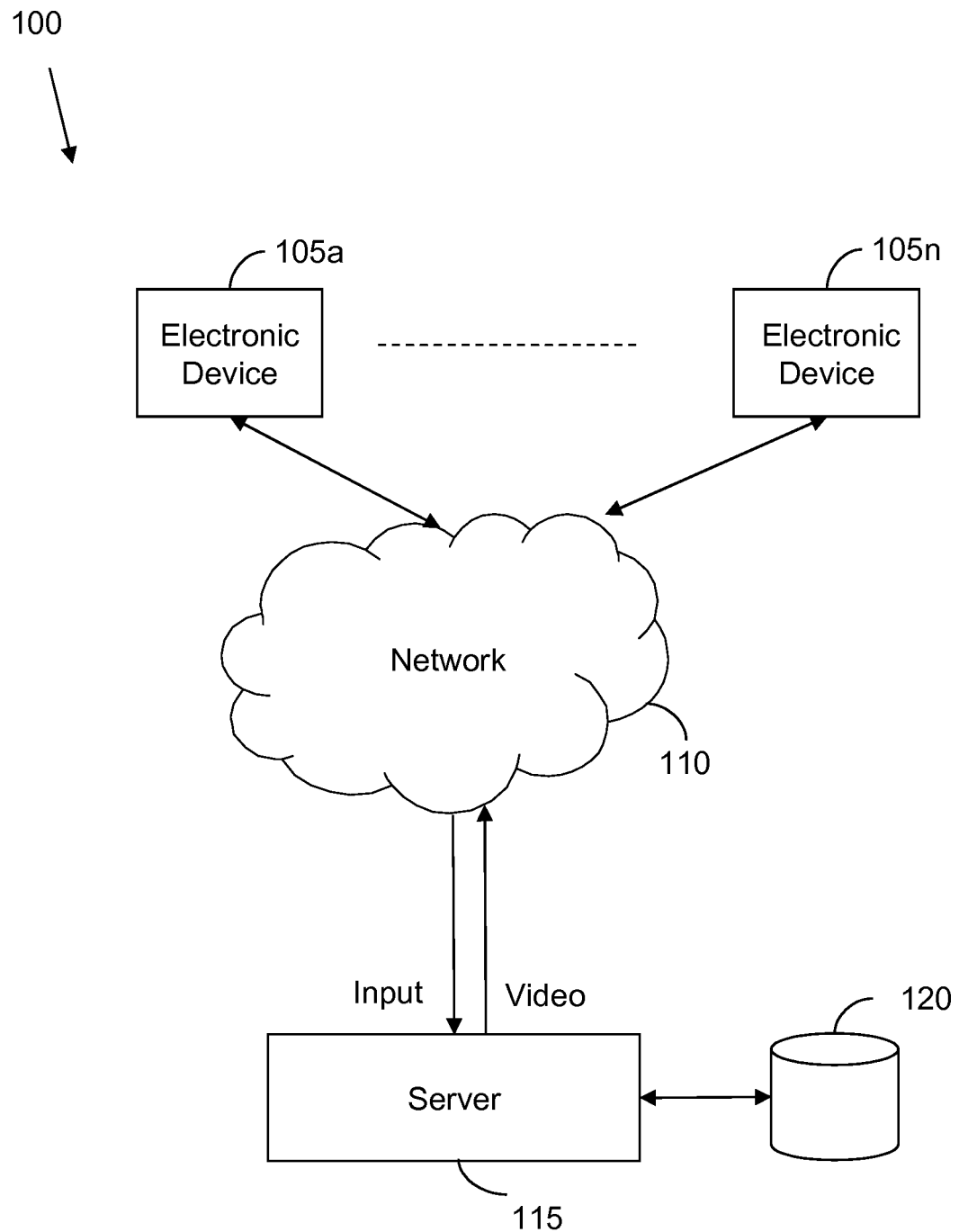
FIG. 1 is a block diagram of an environment, in accordance with which various embodiments can be implemented.

FIG. 1 is a block diagram of an environment 100, in accordance with which various embodiments can be implemented. The environment 100 includes one or more electronic devices used by an end user to provide search query, for example an electronic device 105a and an electronic device 105n, connected to each other through a network 110. Examples of the electronic devices include, but are not limited to, computers, laptops, mobile devices, hand held devices, internet protocol televisions, and personal digital assistants (PDAs). Examples of the network 110 include but are not limited to a Local Area Network (LAN), a Wireless Local Area Network (WLAN), a Wide Area Network (WAN), internet and a Small Area Network (SAN). The electronic devices are also connected to a server 115 through the network 110. The server 115 is connected to a storage device 120.

A user of the electronic device 105a accesses a web site storing video files, for example Yahoo!® video files, and enters a search query. The search query for video files of a desired type is communicated to the server 115 through the network 110 by the electronic device 105a in response to the user inputting the search query. The desired type is either a slideshow video file or a non-slideshow video file. A slideshow video file is a presentation of a series of static photographic slides assembled together with or without voice and text, for example a power point presentation including a plurality of images spread over a timeline. A video file other than the slideshow video file is referred to as the non-slideshow video file, for example a real video file captured with a video file camera.

The server 115 identifies video files based on the desired type. The server 115 fetches video files from the storage device 120 and provides the video files satisfying the desired type to the user of the electronic device 105a. In some embodiments, the server 115 determines type of the video file offline and stores the video file along with a tag signifying the type in the storage device 120. The server 115 can then fetch the video files, check the tags, and provide the video file results to the user.

The storage device 120 stores the video files. The storage device 120 can be a distributed system.

The server 115 includes a plurality of elements for performing video file search. The server 115 including the elements is explained in detail in FIG. 2.

Figure 2:
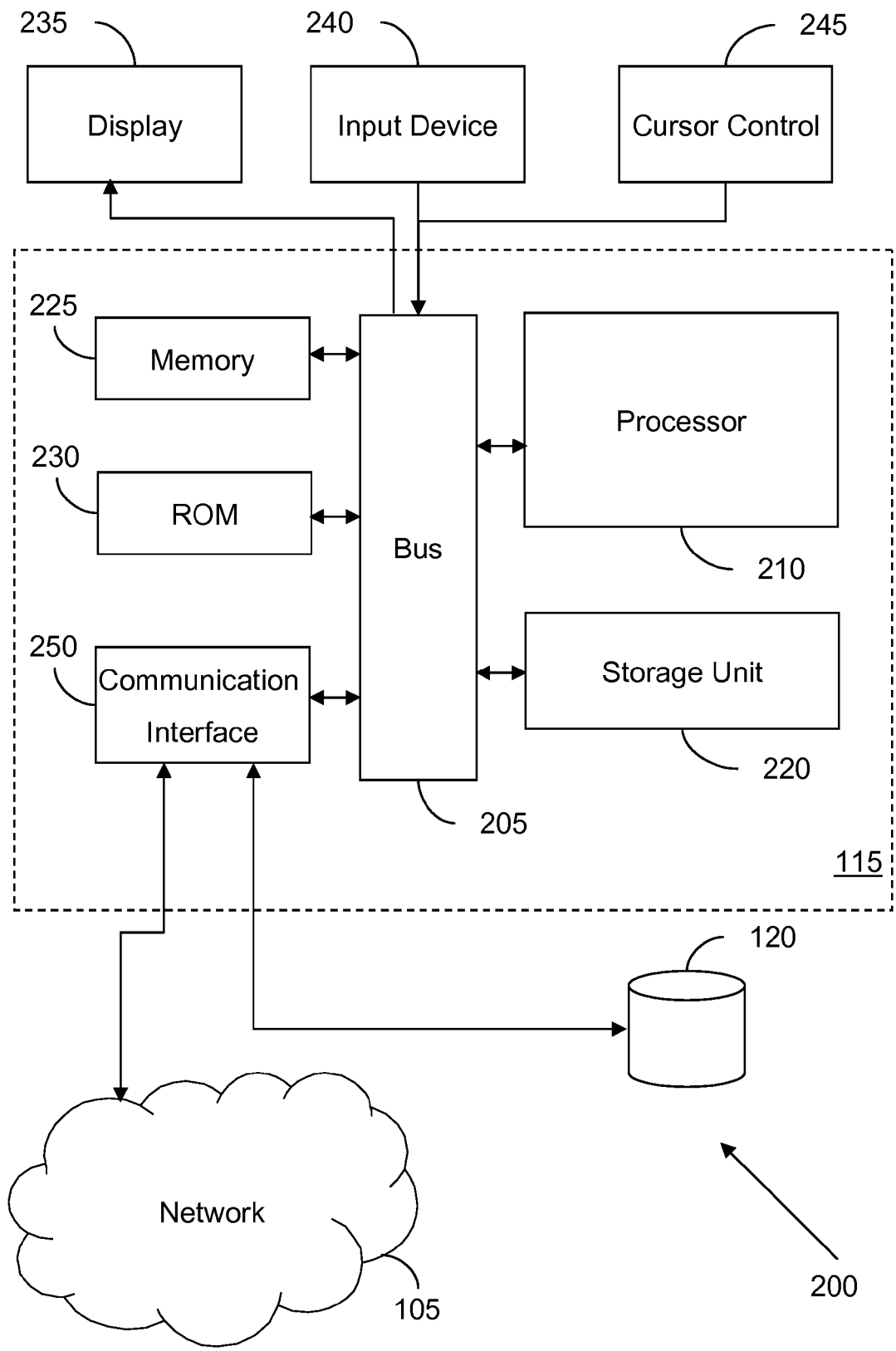
FIG. 2 is a block diagram of a server, in accordance with one embodiment.

FIG. 2 is a block diagram of the server 115, in accordance with one embodiment. The server 115 includes a bus 205 or other communication mechanism for communicating information, and a processor 210 coupled with the bus 205 for processing information. The server 115 also includes a memory 225, such as a random access memory (RAM) or other dynamic storage device, coupled to the bus 205 for storing information and instructions to be executed by the processor 210. The memory 225 can be used for storing temporary variables or other intermediate information during execution of instructions to be executed by the processor 210. The server 115 further includes a read only memory (ROM) 230 or other static storage device coupled to bus 205 for storing static information and instructions for processor 210. A storage unit 220, such as a magnetic disk or optical disk, is provided and coupled to the bus 205 for storing information.

The server 115 can be coupled via the bus 205 to a display 235, such as a cathode ray tube (CRT), for displaying information to a user. An input device 240, including alphanumeric and other keys, is coupled to bus 205 for communicating information and command selections to the processor 210. Another type of user input device is a cursor control 245, such as a mouse, a trackball, or cursor direction keys for communicating direction information and command selections to the processor 210 and for controlling cursor movement on the display 235.

Various embodiments are related to the use of server 115 for implementing the techniques described herein. In one embodiment, the techniques are performed by the server 115 in response to the processor 210 executing instructions included in the memory 225. Such instructions can be read into the memory 225 from another machine-readable medium, such as the storage unit 220. Execution of the instructions included in the memory 215 causes the processor 210 to perform the process steps described herein.

The term "machine-readable medium" as used herein refers to any medium that participates in providing data that causes a machine to operate in a specific fashion. In an embodiment implemented using the server 115, various machine-readable medium are involved, for example, in providing instructions to the processor 210 for execution. The machine-readable medium can be a storage media. Storage media includes both non-volatile media and volatile media. Non-volatile media includes, for example, optical or magnetic disks, such as storage unit 220. Volatile media includes dynamic memory, such as the memory 225. All such media must be tangible to enable the instructions carried by the media to be detected by a physical mechanism that reads the instructions into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fiber optics, including the wires that comprise the bus 205. Transmission media can also take the form of acoustic or light waves, such as those generated during radio-wave and infra-red data communications. Examples of machine-readable medium may include but are not limited to a carrier wave as describer hereinafter or any other medium from which the server 115 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 225, from which the processor 210 retrieves and executes the instructions. The instructions received by the memory 225 can optionally be stored on storage unit 220 either before or after execution by the processor 210. All such media must be tangible to enable the instructions carried by the media to be detected by a physical mechanism that reads the instructions into a machine.

The server 115 also includes a communication interface 250 coupled to the bus 205. The communication interface 250 provides a two-way data communication coupling to the network 105. For example, the communication interface 250 can be an integrated services digital network (ISDN) card or a modem to provide a data communication connection to a corresponding type of telephone line. As another example, the communication interface 250 can be a local area network (LAN) card to provide a data communication connection to a compatible LAN. Wireless links can also be implemented. In any such implementation, the communication interface 250 sends and receives electrical, electromagnetic or optical signals that carry digital data streams representing various types of information.

The server 115 can receive the search query for a desired type of video file through the communication interface 250. The search query can be processed by the processor 210. A machine learning tool determines the type of video files stored in the storage device 120. One or more video files of the desired type are then provided to the user.

In some embodiments, the processor 210 can include one or more processing units for performing one or more function of the processor 210. The processing units are hardware circuitry performing specified functions.

Figure 3:
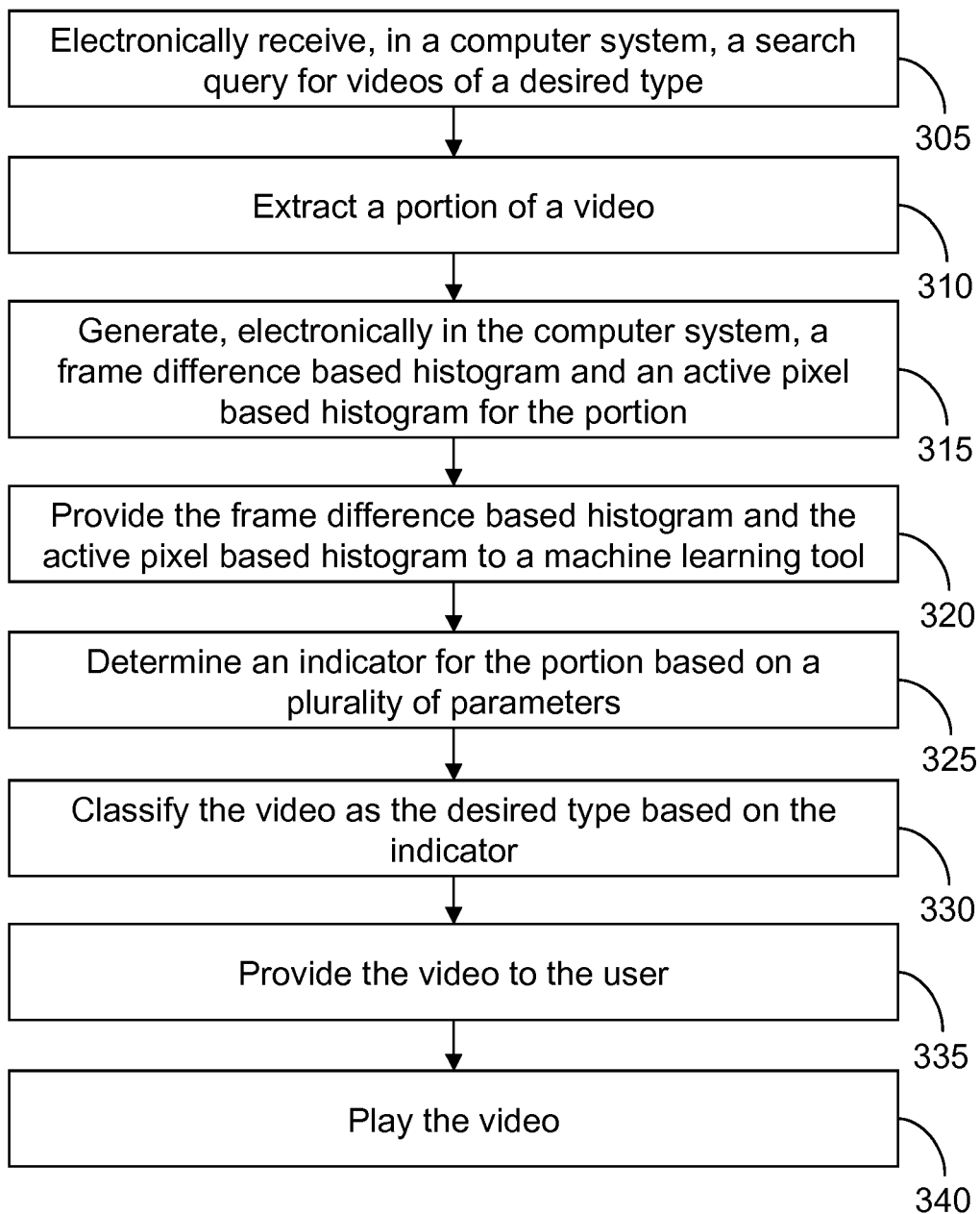
FIG. 3 is a flowchart illustrating a method for searching video files, in accordance with one embodiment.

FIG. 3 is a flowchart illustrating a method for searching video files, in accordance with one embodiment.

At step 305, a search query for video files of a desired type is received. The search query is received in a computer system, for example a server. A user of an electronic device using a video file search application can input the search query. Examples of the desired type include, but are not limited to, a slideshow video file and a non-slideshow video file.

The search query can include a keyword, keyphrase, or a list of words that the user can type for the purpose of the search. In addition the user can specify the desired type of the video file.

At step 310, a portion of a video file is extracted. The video file includes a plurality of frames separated by frame lines. A frame is a still image which constitutes to a complete moving picture. There can be several frames, for example twenty four frames, for each second of the video file. The portion of the video file includes information of frame rate. The frame rate is the frequency of frames per second of the video file.

It will be appreciated that the portion of the video file can correspond to the beginning, middle, end or any portion of the video file. The portion can be extracted for a predefined duration.

At step 315, a frame difference based histogram and an active pixel based histogram are generated electronically, in the computer system, for the portion.

A histogram is a graphical representation of tabulated frequencies, showing what proportion of cases fall into each category of several categories. The categories can also be termed as "bins" and is represented on the X axis of the histogram. The bins may be of equal size or of variable size. The Y axis of the histogram represents the frequency of data for each bin.

The frame difference is the difference of the number of pixels between two consecutive frames. The frame difference based histogram is generated based on the frame difference of the portion. The frame difference is computed as the square of the difference between pixel values. For example, if $I_t(i,j)$ is the pixel value at position (i,j) in frame t and $I_{t+1}(i,j)$ at time t+1, then the difference at (i,j) is $(I_t(i,j)-I_{t+1}(i,j))^2$. The position (i,j) represents the pixel coordinates along row and column dimensions respectively of the frame. The sum over all pixel values of the squared difference is called as sum of squared difference (SSD). The SSD measure is directly proportional to the dynamics of the current frame with respect to next frame. A high value on the Y axis signifies a higher difference between the two consecutive frames. If the two consecutive frames have completely different images, then the frame difference will be of a high value represented on the Y axis and this can happen in case of slideshow video files. Similarly, if the two consecutive frames have similar images, then the frame difference will be of a low value represented on the X axis and this can happen in real video files. The difference is based on the size of the image associated to the frame.

The active pixel based histogram is generated based on count of pixels above a threshold value in the frame difference based histogram. A threshold value is a value that filters pixels of a low quality from the rest of pixels present in a frame. An active pixel is a pixel above the threshold value signifying a high quality. The active pixel based histogram is built by counting the number of pixels that contribute to the 'frame difference' for a pair of two consecutive frames. The measure provides information about the fraction of active pixels involved in a frame.

The frame difference based histogram and the active pixel based histogram can be generated for each frame of the portion and can be processed to yield a single frame difference based histogram and a single active pixel based histogram for the portion.

The frame difference based histogram of a slideshow video file has higher values in the lower bin ranges, where as for regular video file the values are higher for higher bin ranges. The active pixel based histogram of the slideshow video file has few bins having higher values, whereas for regular video file, the values are distributed over a wide range of bins.

In some embodiments, a final histogram is generated and fed to a machine learning tool. The final histogram is a concatenation of the frame difference based histogram and the active pixel based histogram.

At step 320, the frame difference based histogram and the active pixel based histogram are provided to a machine learning tool.

A machine learning tool is an application that enables the computer system to learn by automatically extracting information from input data. Examples of the machine learning tool include, but are not limited to, Adaboost, Support Vector Machines (SVM), Artificial Neural Networks (ANN), Gaussian Process regression, Logistic Regression, Decision Tree Learning, Bayes Classifier, Nearest Neighbor Algorithm, and Backpropogation.

At step 325, an indicator for the portion of the video file is determined based on a plurality of parameters. The indicator is a positive sign or a negative sign. The positive sign signifies that the video file is a slideshow and the negative sign signifies that the video file is a non-slideshow. The plurality of parameters includes sign vector, feature vector, weight vectors and threshold vector associated with the portion. Further, the plurality of parameters is generated by the machine learning tool.

The sign vector is a sequence of the digit "1" along with a positive sign or a negative sign, previously learned by the machine learning tool. The feature vector is a sequence of number of features used from the total number of features, which are around 288. A feature is a count in one of the bins of either the frame difference histogram or the active pixel histogram. The weight vector is the weight of each weak classifier and indicates the importance of the weak classifier. A classifier is a system, which assigns a label to a feature vector. The label is either a slideshow label or non-slideshow label. The weak classifier is a classifier whose output is correct with probability greater than 0.5. The weak classifiers are typically arranged in descending order of importance. The threshold vector is the corresponding threshold values of the pixels.

Examples of the sign vectors (S), feature vectors (F), weight vectors (W), and threshold vectors are shown below:

$S = [1\ -1\ 1\ -1\ 1\ 1\ 1\ 1\ 1\ -1\ -1\ -1\ -1\ 1];$ $F = [2\ 116\ 3\ 219\ 124\ 2\ 3\ 57\ 1\ 30\ 116\ 118\ 3\ 191\ 171];$ $W = [1.437\ 1.4778\ 0.91171\ 1.0854\ 1.088\ 1.047\ 0.89736\ 0.87163\ 0.78798\ 1.0384\ 0.89604\ 0.97977\ 0.92199\ 0.82783];$ $T = [0.0014905\ 0.0002145\ 0.0003975\ 6.5e\text{-}06\ 0.0002145\ 0.0018165\ 4.55e\text{-}05\ 0.000156\ 0.0028975\ 0.000195\ 0.0002145\ 6.5e\text{-}0\ 0.0003975\ 4.55e\text{-}05\ 5.85e\text{-}05]$ A new sign vector (X) is determined using a Feature value vector (FVAL) and the threshold vector (T). FVAL denotes the feature values corresponding to the feature vector (F) of the video file. The value of X is "1" if F(i)>T (i) else the value is "−1".

The FVAL vector and the new sign vector (X) for the above examples are shown below:

FVAL=[0.003229 1.3e-05 0.002422 0 0.00013
0.003229 0.002422 1.3e-05 0.000104 1.3e-05
0.00207 0.002422 1.3e-05 1.3e-05];

The corresponding X vector is:

$X = [1\ -1\ 1\ -1\ -1\ 1\ 1\ -1\ -1\ -1\ -1\ 1\ 1\ -1\ -1];$

The indicator (D) is obtained using an equation as shown below:

$D = \Sigma S(i) * W(i) * X(i))$

The indicator (D) for the above example is 12.14.

At step 330, the video file is classified as the desired type based on the indicator. If the indicator is a positive value, the video file is tagged as a slideshow video file. If the indicator is a negative value, the video file is tagged as a non-slideshow video file.

For example, the value of the indicator is 12.14 and hence, the video file is tagged as a slideshow video file.

In some embodiments, the machine learning tool can be trained by inputting 50-75 video file samples along with the type of video file samples. The machine learning tool can then have a set of values for the plurality of parameters and can give a verdict based on these values.

At step 335, the video file is provided to the user. The video file is provided based on the desired type included in the search query. For example, if the user searched for slideshow video files then the results can include slideshow video files. In some embodiments, both the results can be displayed along with the tags representing type of the video file.

At step 340, the video file is played. The video file can be played in response to selection of the video file by the user.

Figure 4A:
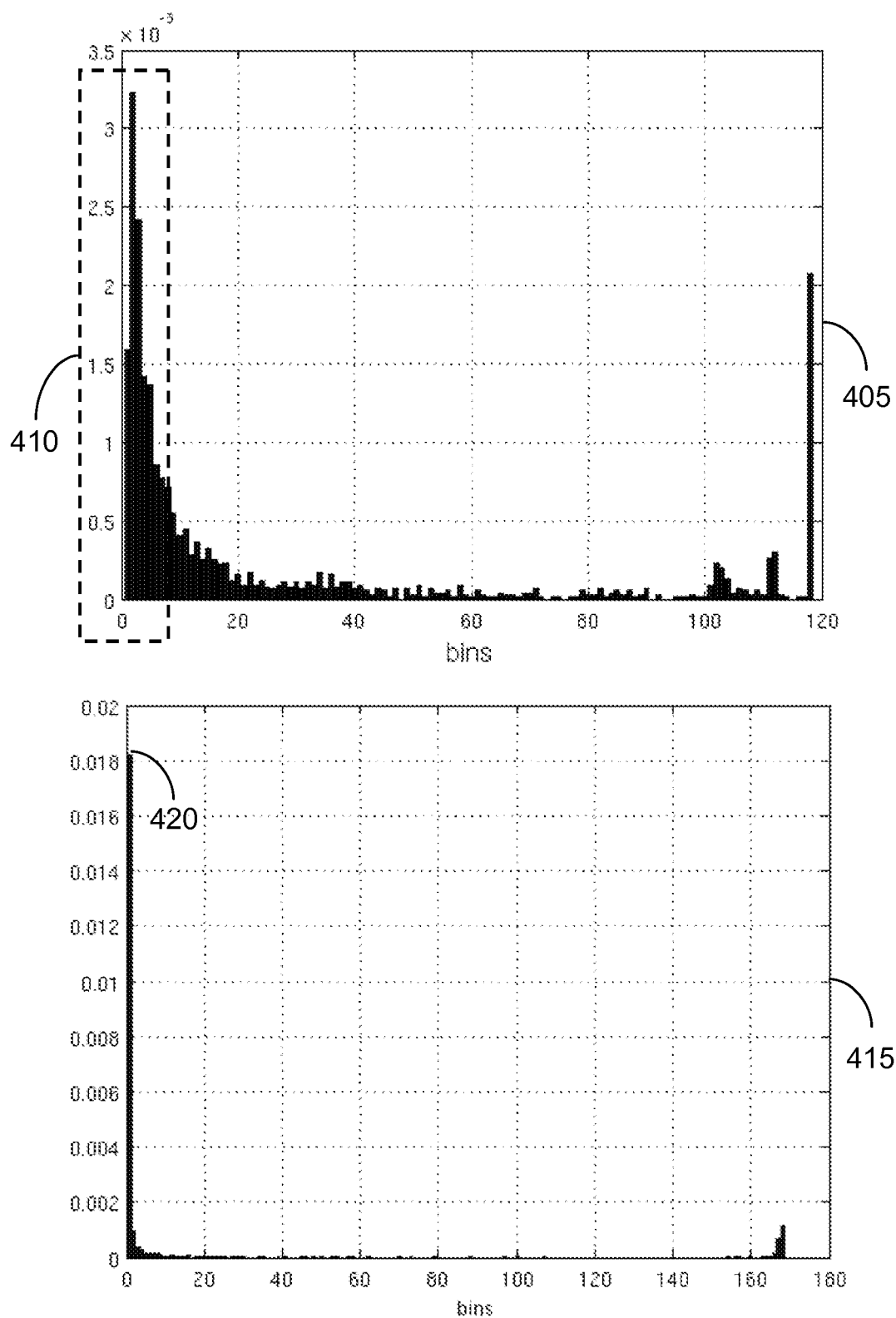
FIG. 4a and FIG. 4b are exemplary representations of histograms of a slideshow video file, in accordance with one embodiment.
Figure 4B:
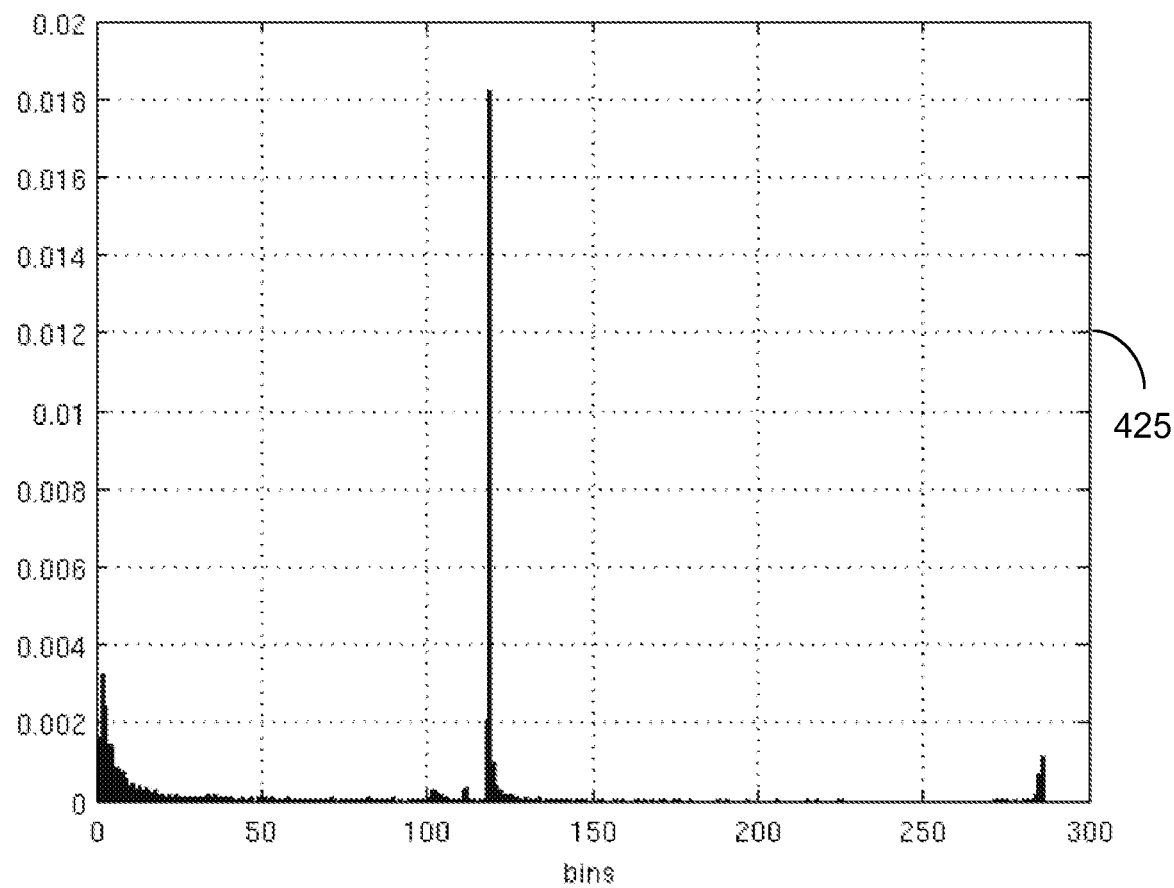

FIG. 4a and FIG. 4b are exemplary representations of histograms of a slideshow video file, in accordance with one embodiment.

A frame based histogram 405 represents the frame difference between every two consecutive frames of an extracted portion of the slideshow video file. The bin values are from 1 to 118. The frame based histogram 405 of the slideshow video file has higher values in the lower bin ranges 410.

An active pixel based histogram 415 has bin values from 119 to 288. A threshold value is predefined and a count of pixels above the threshold value is represented. The active pixel based histogram 415 of the slideshow video file has few number of bins 420 having high values.

A final histogram 425 can be generated by concatenating the frame based histogram 405 and the active pixel based histogram 415. The final histogram 425 represents less data distributed over the bin range signifying a low transition between frames of the extracted portion of the slideshow video file.

Figure 5A:
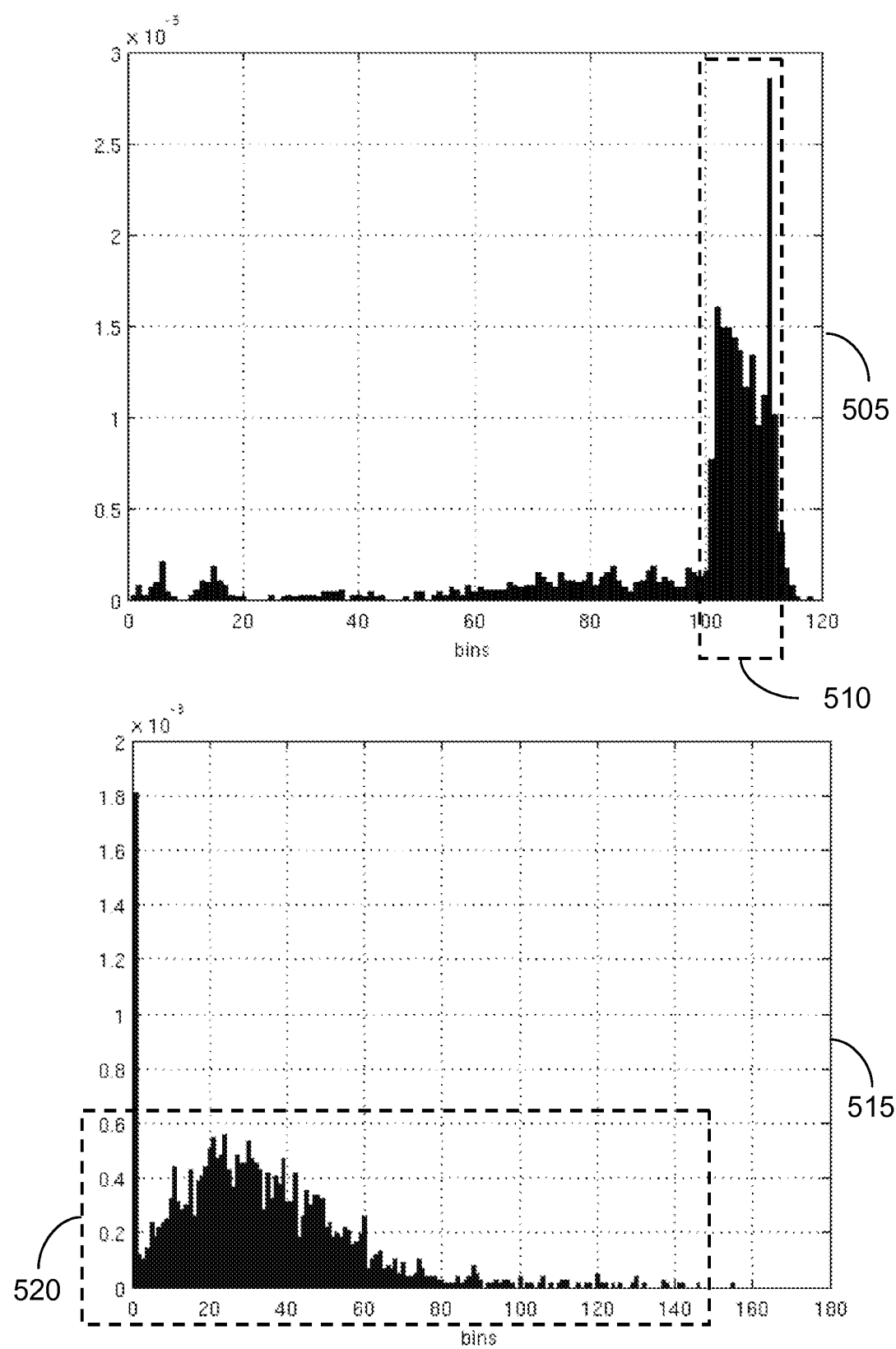
FIG. 5a and FIG. 5b are exemplary representations of histograms of a non-slideshow video file, in accordance with one embodiment.
Figure 5B:
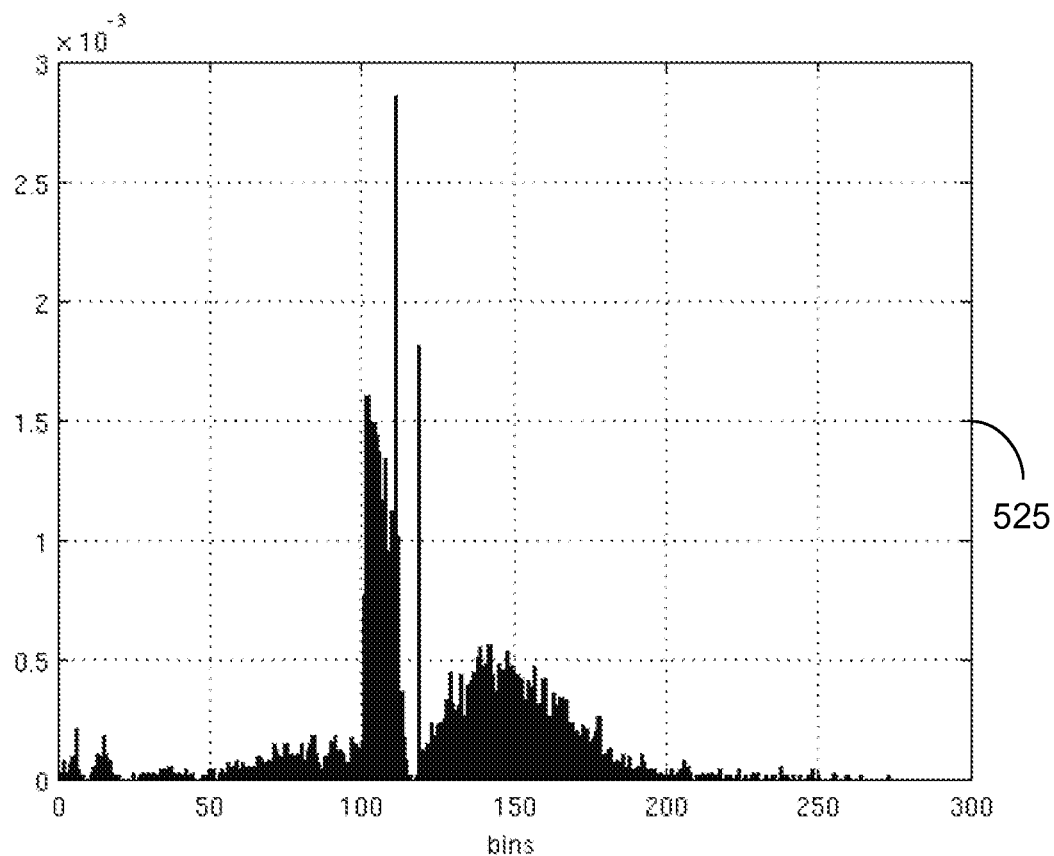

FIG. 5a and FIG. 5b are exemplary representations of histograms of a non-slideshow video file, in accordance with one embodiment.

A frame based histogram 505 represents the frame difference between every two consecutive frames of an extracted portion of the non-slideshow video file. The bin values are from 1 to 118. The frame based histogram 505 of the non-slideshow video file has higher values in the higher-bin ranges 510.

An active pixel based histogram 515 has bin values from 119 to 288. A threshold value is predefined and a count of pixels above the threshold value is represented. The active pixel based histogram 515 of the non-slideshow video file has the values distributed over a wide range of bins 520.

A final histogram 525 can be generated by concatenating the frame based histogram 505 and the active pixel based histogram 515. The final histogram 525 represents a large volume of data distributed over the bin range signifying a high transition between the frames of the extracted portion of the non-slideshow video file.

Various embodiments provide classification of a video file as either the slideshow video file or the non-slideshow video file. The user experience for video file search is enhanced by prioritizing the non-slideshow video files over slideshow video files. On the other hand, if the user is looking for slideshows in video file search, the present disclosure will help to pool more slideshow video files. The embodiments can be used in various applications, for example Yahoo!® video files, Yahoo!® video file search, and Yahoo!® image search.

While exemplary embodiments of the present disclosure have been disclosed, the present disclosure may be practiced in other ways. Various modifications and enhancements may be made without departing from the scope of the present disclosure. The present disclosure is to be limited only by the claims.

What is claimed is:

1. An article of manufacture comprising:
   a non-transitory machine-readable medium; and
   instructions stored on the medium and operable to cause a programmable processor to perform:
   providing an option to a user to search for a slideshow type video file, along with a query that specifies video file content to be searched;
   receiving a search query for video files of a desired type;
   extracting at least a portion from a video file corresponding to the content of the search query to determine if the video file is a slideshow type video file, comprising:
   generating a frame difference based histogram and an active pixel based histogram for the portion, wherein the active pixel based histogram is generated based on count of pixels above a threshold value in the frame difference based histogram;
   providing the frame difference based histogram and the active pixel based histogram to a machine learning tool;
   determining an indicator for the portion based on a plurality of parameters, wherein the plurality of parameters comprise sign vectors, feature vectors, weight vectors and threshold vectors associated with the portion;
   classifying the video file as the desired type based on the indicator; and
   responsive to the video file comprising a slideshow type video file, providing the video file to the user.

2. The article of manufacture of claim 1, wherein the desired type comprises at least one of:
   a slideshow video file; and
   a non-slideshow video file.

3. The article of manufacture of claim 1, wherein the frame difference based histogram is generated based on frame differences between two consecutive frames of the portion.

4. The article of manufacture of claim 1, wherein the determining comprises:
   generating the sign vectors, the feature vectors, the weight vectors and the threshold vectors.

5. The article of manufacture of claim 1, wherein the machine learning tool comprises at least one of:
   Adaboost, Artificial Neural Networks (ANN), Gaussian Process regression, Logistic Regression, Decision Tree Learning, Bayes Classifier, Nearest Neighbor Algorithm, and Backpropogation.

6. The article of manufacture of claim 1, wherein the classifying comprises:
   tagging the video file as a slideshow video file if the indicator is positive; and
   tagging the video file as a non-slideshow video file if the indicator is negative.

7. The article of manufacture of claim 1 further comprising instructions operable to cause the programmable processor to perform:
   playing the video file.

8. A method for searching video files, the method comprising:
   providing, in a computer system, an option to a user to search for slideshow type video files along with a query that specifies video content to be searched;
   receiving a search query for video files of a desired type;

extracting at least a portion from a video file corresponding to the content of the search query to determine if the video file is a slideshow type video file, comprising:

generating, electronically in the computer system, a frame difference based histogram and an active pixel based histogram for the portion, wherein the active pixel based histogram is generated based on count of pixels above a threshold value in the frame difference based histogram;

providing the frame difference based histogram and the active pixel based histogram to a machine learning tool;

determining an indicator for the portion based on a plurality of parameters, wherein the plurality of parameters comprise sign vectors, feature vectors, weight vectors and threshold vectors associated with the portion;

classifying the video file as the desired type based on the indicator; and responsive to the video file comprising a slideshow type video file, providing the video file to the user.

9. The method of claim 8, wherein the desired type comprises at least one of:

a slideshow video file; and a non-slideshow video file.

10. The method of claim 8, wherein the frame difference based histogram is generated based on frame differences between two consecutive frames of the portion.

11. The method of claim 8, wherein the determining comprises:

generating the sign vectors, the feature vectors, the weight vectors and the threshold vectors.

12. The method of claim 8, wherein the machine learning tool comprises at least one of:

Adaboost, Artificial Neural Networks (ANN), Gaussian Process regression, Logistic Regression, Decision Tree Learning, Bayes Classifier, Nearest Neighbor Algorithm, and Backpropogation.

13. The method of claim 8 further comprising:

playing the video file.

* * * * *